United States Patent [19]
Iikawa et al.

[11] Patent Number: 5,969,889
[45] Date of Patent: Oct. 19, 1999

[54] LENS BARREL

[75] Inventors: Makoto Iikawa; Tomoaki Kobayashi, both of Saitama, Japan

[73] Assignee: Asahi Kogaku Kogyo Kabushiki Kaisha, Tokyo, Japan

[21] Appl. No.: 09/106,185

[22] Filed: Jun. 29, 1998

[30] Foreign Application Priority Data

Jun. 30, 1997 [JP] Japan .............................. P09-189159

[51] Int. Cl.⁶ ..................................................... G02B 7/02
[52] U.S. Cl. ........................................... 359/825; 359/823
[58] Field of Search .................................... 359/825, 823, 359/822, 811, 819, 676, 694, 699, 698

[56] References Cited

U.S. PATENT DOCUMENTS

| | | |
|---|---|---|
| 4,324,457 | 4/1982 | Tomori . |
| 4,333,712 | 6/1982 | Tomori . |
| 4,506,959 | 3/1985 | Hama . |
| 4,523,815 | 6/1985 | Tomori . |
| 4,893,145 | 1/1990 | Matsuda . |
| 5,144,494 | 9/1992 | Sekiguchi . |
| 5,239,417 | 8/1993 | Eguchi . |
| 5,786,946 | 7/1998 | Imura ...................................... 359/695 |

FOREIGN PATENT DOCUMENTS

| | | |
|---|---|---|
| 63-193119 | 8/1988 | Japan . |
| 4-344609 | 12/1992 | Japan . |

*Primary Examiner*—Hung Xuan Dang
*Attorney, Agent, or Firm*—Greenblum & Bernstein, P.L.C.

[57] ABSTRACT

A lens barrel has an immovable cylindrical member adapted to be detachably attached to a camera body, and a lens holder for holding a group of focusing lenses. The holder is disposed in the member so as to be movable along an optical axis of the focusing lenses for a focusing adjustment. A manual-focusing ring, rotatably mounted on the member, is manually movable along the optical axis between an auto-focusing (AF) position and a manual-focusing (MF) position, and has a plurality of recesses circumferentially arranged and formed on an inner wall surface thereof. A drive mechanism, provided between the member and the holder to convert a rotation into a translation of the holder along the optical axis, has at least a pin which is subjected to the rotation. The pin is engaged in one of the recesses of the ring when the ring is at the MF position, such that a rotation of the ring is transmitted to the drive mechanism. The pin is disengaged from the one of the recesses of the ring when the ring is at the AF position.

12 Claims, 5 Drawing Sheets

LENS BARREL

BACKGROUND OF THE INVENTION

1. Field of the Invention

This invention relates to a lens barrel detachably attached to a camera body, in which either an auto-focusing (AF) mode or a manual-focusing (MF) mode is selectable.

2. Description of the Related Art

Such a lens barrel comprises an immovable cylindrical member adapted to be detachably attached to a camera body, and a movable cylindrical member concentrically disposed in the immovable cylindrical member. The movable cylindrical member serves as a lens holder for holding a group of focusing lenses, and is movable along an optical axis of the focusing lenses to perform a focusing adjustment in accordance with a distance between the camera and an object to be photographed.

A drive mechanism is provided between the lens holder and the immovable cylindrical member to move the lens holder along the optical axis, enabling the focusing adjustment to be performed, and is operatively joined to a drive motor, provided in the camera body, upon attaching the lens barrel to the camera body. The drive motor is driven in accordance with an auto-focusing system incorporated in the camera, and a rotational movement of the drive motor is converted into a translational movement by the drive mechanism, which is then transmitted to the lens holder, such that the focusing adjustment is performed.

On the other hand, the lens barrel is provided with a manual-focusing ring rotatably provided around the immovable cylindrical member, and the manual-focusing ring is engaged with the drive mechanism. Thus, a manual rotational movement of the manual-focusing ring is also converted into a translational movement, which is then transmitted to the lens holder, such that the focusing adjustment is performed.

Of course, the lens barrel is further provided with a focusing-mode changeover mechanism for changing from the AF mode to the MF mode and vice versa.

When the AF mode is selected by the focusing-mode changeover mechanism, the drive mechanism is only actuated by the drive motor provided in the camera body, whereby an auto-focusing adjustment is carried out. In this case, of course, the drive mechanism is disengaged from the manual-focusing ring such that the transmission of the movement of the manual-focusing ring to the lens holder is prohibited.

When the MF mode is selected by the focusing-mode changeover mechanism, the drive mechanism is driven by only the manual-focusing ring, whereby a manual-focusing adjustment is carried out. Of course, in the MF mode, the drive mechanism is disconnected from the drive motor such that the transmission of the movement of the drive motor to the lens older is prohibited.

Unexamined Japanese Patent publication No. S63-193119 discloses a type of lens barrel, in which an AF/MF changeover-operating ring for manually actuating the focusing-mode changeover mechanism is movably mounted on the immovable cylindrical member. Either the AF mode or the MF mode is selected by manually operating the AF/MF changeover-operating ring. This conventional type of lens barrel is relatively bulky because both the manual-focusing ring and the changeover ring are mounted on the immovable cylindrical member. Also, a camera using this lens barrel is troublesome to manipulate, because it is necessary to independently operate the manual-focusing ring and the AF/MF changeover-operating ring.

Unexamined Japanese Patent publication No. H04-344609 discloses another type of lens barrel having a single ring, which serves both as a manual-focusing ring and an AF/MF changeover-operating ring. In this type of lens barrel, the single ring is rotatably mounted on the immovable cylindrical member, but it is movable along a longitudinal axis of the immovable cylindrical member between an auto-focusing (AF) position and a manual-focusing (MF) position.

When the single ring is at the AF position, the AF mode is selected. In this case, the drive mechanism is only actuated by the drive motor provided in the camera body, whereby an auto-focusing adjustment is carried out. Namely, the drive mechanism is disengaged from the manual-focusing ring such that the transmission of the movement of the manual-focusing ring to the lens holder is prohibited.

On the other hand, when the single ring is moved from the AF position to the MF position, the MF mode is selected, i.e. the single ring serves as the manual-focusing ring. In this case, the drive mechanism is disconnected from the drive motor, and a resiliently-frictional engagement is established between the drive mechanism and the single ring or manual-focusing ring. Thus, a manual rotational movement of the single ring or manual-focusing ring is converted into a translational movement by the drive mechanism, which is then transmitted to the lens holder, such that the focusing adjustment is performed.

Nevertheless, the type of lens barrel, as disclosed in Unexamined Japanese Patent publication No. H04-344609, is unreliable, because a slippage in the resiliently-frictional engagement may occur between the drive mechanism and the single ring or manual-focusing ring. The severity of the slippage increases as the lens barrel ages, due to wearing of parts undertaking the resiliently-frictional engagement.

To ensure a proper resiliently-frictional engagement between the drive mechanism and the single ring or manual-focusing ring over a long service life period, it is possible to incorporate a highly resilient spring in the drive mechanism. Nevertheless, this approach is unadvisable, because a distortion or deformation may occur in the lens barrel due to the high resiliency of the spring.

SUMMARY OF THE INVENTION

Therefore, an object of the present invention is to provide a lens barrel detachably attached to a camera body, wherein either an auto-focusing mode or a manual-focusing mode is selectable by a manual-focusing ring that performs a focusing adjustment in the manual-focusing mode, such that the manual focusing adjustment can be reliably executed.

In accordance with an aspect of the present invention, there is provided a lens barrel comprising an immovable cylindrical member detachably mountable on a camera body, and a movable cylindrical member including a group of focusing lenses held therein. The movable cylindrical member is disposed in the immovable cylindrical member so as to be movable along an optical axis of the group of focusing lenses such that a focusing adjustment is performed. The lens barrel also comprises a manual-focusing ring rotatably mounted on the immovable cylindrical member. The manual-focusing ring is manually movable along the optical axis between an auto-focusing position and a manual-focusing position, and has a plurality of recesses circumferentially arranged and formed on an inner wall surface thereof. The lens barrel further comprises a drive mechanism provided between the immovable cylindrical member and the movable cylindrical member to convert a rotational movement into a translational movement of the movable cylindrical member along the optical axis, and the drive mechanism has at least a pin element which is subjected to the rotational movement. When the manual-focusing ring is positioned at the manual-focusing position, the pin element is engaged in one of the plurality of recesses of the manual-focusing ring, such that a rotation of the manual-focusing ring is transmitted to the drive mechanism. When the manual-focusing ring is positioned at the auto-focusing position, the pin element is disengaged from the one of the plurality of recesses of the manual-focusing ring.

In accordance with another aspect of the present invention, a lens barrel comprises an immovable cylindrical member detachably mountable on a camera body, and a movable cylindrical member including a group of focusing lenses held therein. The movable cylindrical member is disposed in the immovable cylindrical member so as to be movable along an optical axis of the group of focusing lenses such that a focusing adjustment is performed. The lens barrel also comprises a manual-focusing ring rotatably mounted on the immovable cylindrical member. The manual-focusing ring is manually movable along the optical axis between an auto-focusing position and a manual-focusing position, and has a plurality of recesses circumferentially arranged and formed on an inner wall surface thereof. The lens barrel further comprises a drive mechanism provided between the immovable cylindrical member and the movable cylindrical member to convert a rotational movement into a translational movement of the movable cylindrical member along the optical axis, and the drive mechanism has at least a pin element which is subjected to the rotational movement. The lens barrel further comprises a rotational movement transmission system that is operatively connectable to a rotational movement generator, provided in the camera body, on attaching the immovable cylindrical member to the camera body, so that a rotation of the rotational movement generator is transmitted to the drive mechanism. The lens barrel further comprises a changeover mechanism that disengages the first rotational movement transmission system when the position of the manual-focusing ring is at the manual-focusing position, and that disengages the manual-focusing ring from the drive mechanism when the position of the manual-focusing ring is at the auto-focusing position. An engagement is established between the drive mechanism and the manual-focusing ring, when the position of the manual-focusing ring is at the manual-focusing position, such that the pin element is engaged in one of the plurality of recesses of the manual-focusing ring so that a rotation of the manual-focusing ring is transmitted to the drive mechanism.

Preferably, the pin element is resiliently biased toward the inner wall surface of the manual-focusing ring by an urging element, whereby the pin element is positively engaged in the one of the plurality of recesses.

The drive mechanism may include an annular ring element having a hole that receives the pin element, and a leaf spring element supported in a cantilevered-fashion by the annular ring element, and the pin element is securely fixed to a free end of the leaf spring element.

The immovable cylindrical member may include a resiliently-biased locking pin element, and the resiliently-biased locking pin element is engaged in one of the plurality of recesses, when positioning the manual-focusing ring at the auto-focusing position, whereby the rotation of the manual-focusing ring is prevented.

The plurality of recesses may be arranged at a predetermined pitch angle, and the drive mechanism may comprise at least two pin elements positioned to be independently coincident with a pitch frequency of occurrence of the plurality of recesses. Optionally, the drive mechanism may comprise at least two pin elements positioned to be alternately non-coincident with a pitch frequency of occurrence of the plurality of recesses.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
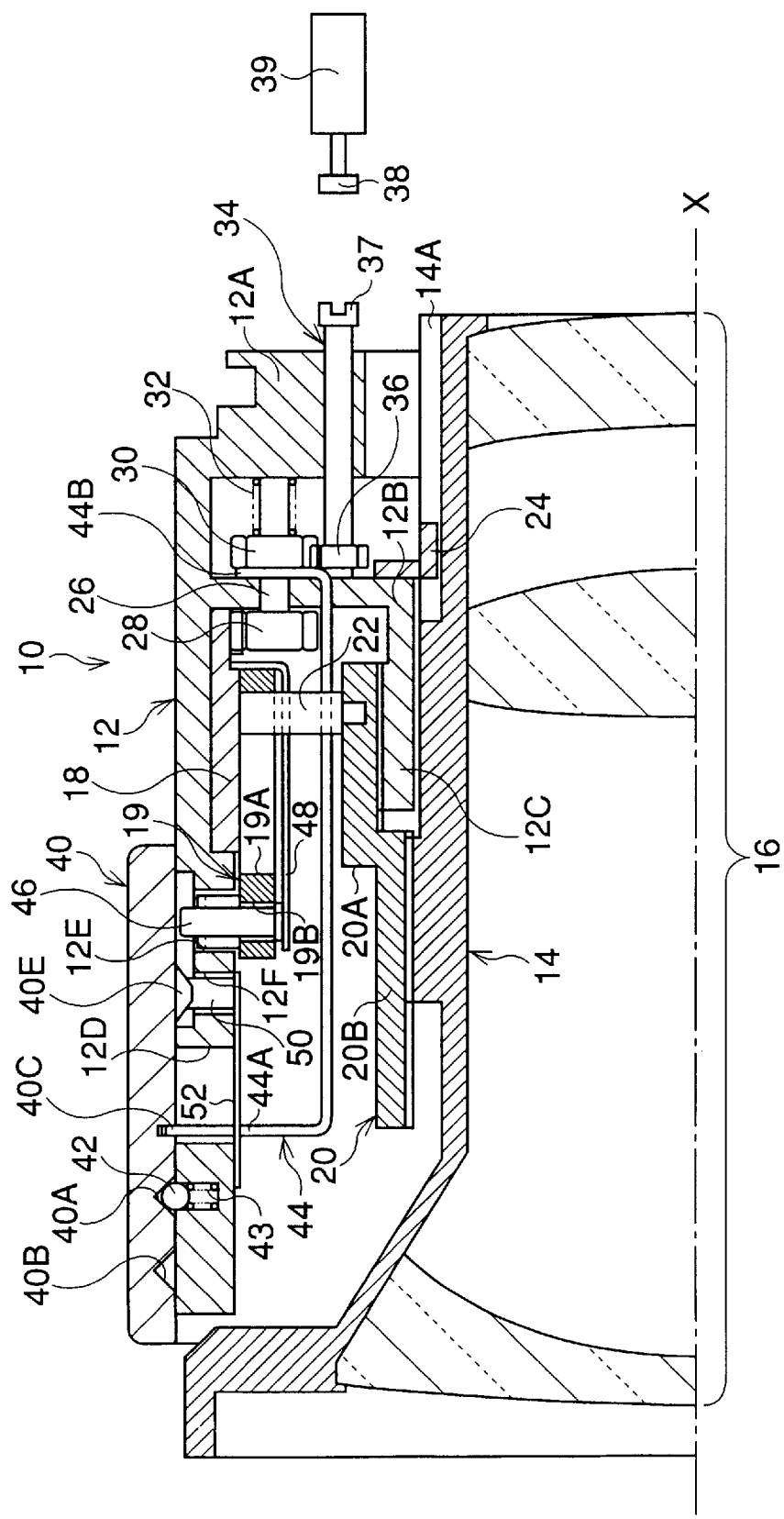
FIG. 1 is a half longitudinal cross-sectional view showing a lens barrel, according to the present invention, in an auto-focusing mode.
Figure 2:
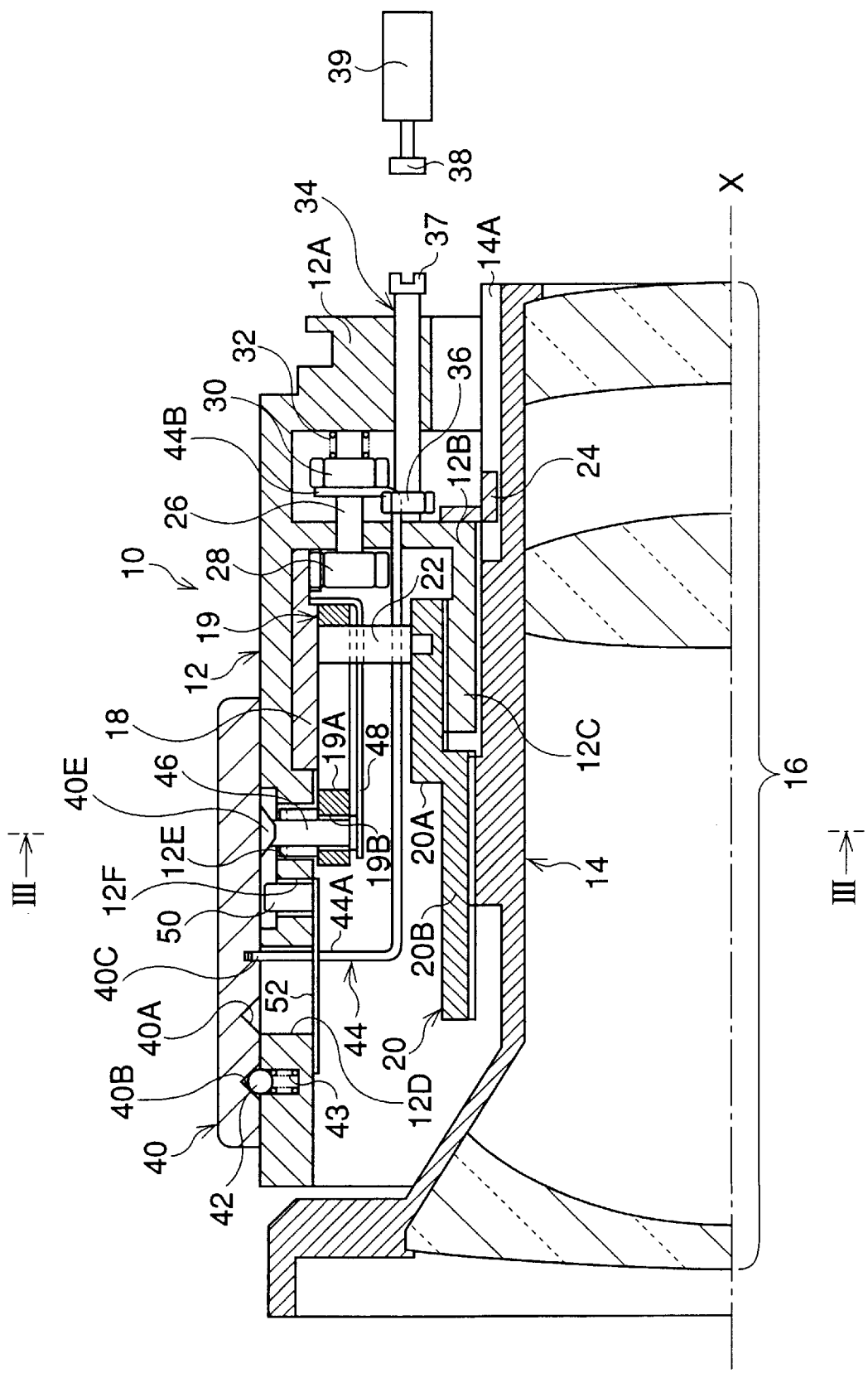
FIG. 2 is a half longitudinal cross-sectional view similar to FIG. 1, showing the lens barrel in a manual-focusing mode.

FIGS. 1 and 2 show a lens barrel, generally indicated by reference 10, which is constructed in accordance with the present invention. The lens barrel 10 is adapted to be detachably attached to a camera body (not shown), which is constituted such that either an auto-focusing (AF) mode or a manual-focusing (MF) mode is selectable by the user. The lens barrel 10 is provided with a focusing-mode changeover mechanism for alternating the AF mode and the MF mode, as stated in detail hereinafter.

The lens barrel 10 comprises an immovable cylindrical member 12, one end 12A of which is adapted to be joined to the camera body, upon mounting the lens barrel 10 to the camera body. The lens barrel 10 also comprises a movable cylindrical member 14 concentrically disposed in the immovable cylindrical member 12, and the movable cylindrical member 14 serves as a lens holder for holding a group of focusing lenses 16 having an optical axis indicated by reference X.

The immovable cylindrical member 12 has an inner annular wall element 12B integrally formed therewith, and the inner annular wall element 12B radially and inwardly extends from the inner wall surface of the immovable cylindrical member 12 at a location near the end 12A. A sleeve element 12C integrally extends from an annular peripheral edge of the inner annular wall element 12B toward another end of the immovable cylindrical member 12, opposite the end 12A. The sleeve element 12C of the immovable cylindrical member 12 is concentric with respect to the immovable cylindrical member 12. The movable cylindrical member or lens holder 14 is slidably inserted into the sleeve element 12C, and is movable along the optical axis X of the focusing lenses 16, so that a focusing adjustment is performed in accordance with a distance between the camera and an object to be photographed.

For the movement of the lens holder 14 along the optical axis X, a drive mechanism is provided between the immovable cylindrical member 12 and the lens holder 14, and comprises a driven-ring element 18 disposed in and in slidable contact with the inner wall surface of the immovable cylindrical member 12, whereby the driven-ring element 18 is rotatable around the optical axis X. The drive mechanism also comprises an annular sleeve element 19 securely fixed to an inner wall surface of the driven-ring element 18, an offset driver sleeve element 20, partially surrounding both the lens holder 14 and the sleeve element 12C of the immovable cylindrical member 12, and a pin element 22 operatively connecting the annular sleeve element 19 and the driver sleeve element 20.

As shown in FIGS. 1 and 2, the driver sleeve element 20 has a diametrically-lager section 20A partially surrounding the sleeve element 12C of the immovable cylindrical member 12 and a diametrically-smaller section 20B partially surrounding the lens holder 14. The pin element 22 is securely engaged with the diametrically-lager section 20A of the driver sleeve element 20, and an upper free end of the pin element 22 is slidably received in an elongated slot 19A, which is formed in the annular sleeve element 19 so as to extend along the optical axis X. Note, in FIGS. 1 and 2, although only one pin element 22 is illustrated, plural pin elements 22 are preferably provided around the diametrically-lager section 20A of the driver sleeve element 20 at regular intervals.

The diametrically-lager section 20A of the driver sleeve element 20 is formed with helicoid threads around the inner surface thereof, and the sleeve element 12C of the immovable cylindrical member 12 is formed with helicoid threads around the outer surface thereof, both the helicoid threads being engaged with each other. Also, the diametrically-smaller section 20B of the driver sleeve element 20 is provided with helicoid threads formed around the inner surface thereof, and the lens holder 14 is provided with helicoid threads formed around a partial section of the outer surface thereof, both the helicoid threads also being engaged with each other.

Further, the lens holder 14 is formed with a linear guide groove 14A in the outer surface thereof, and the linear guide groove 14A is partially extended from one end of the lens holder 14, corresponding to the end 12A of the immovable cylindrical member 12, along the optical axis X. On the other hand, the inner annular wall element 12B of the immovable cylindrical member 12 is provided with a piece element 24 securely fixed thereto, and the piece element 24 is slidably engaged in the linear guide groove 14A of the lens holder 14.

With the arrangement of the drive mechanism as mentioned above, when the driven-ring element 18 is rotated, the rotational force is transmitted from the driven-ring element 18 to the diametrically-lager section 20A of the driver sleeve element 20 through the pin element 22, resulting in a rotation of the driver sleeve element 20. During the rotation of the driver sleeve element 20, simultaneous movement along the optical axis X, due to the existence of the helicoid threads between the diametrically-lager section 20A of the driver sleeve element 20 and the sleeve element 12C of the immovable cylindrical member 12, occurs.

During the rotation and the translation of the driver sleeve element 20 around and along the optical axis X, the lens holder 14 is subjected to both the rotational force and the translational force around and along the optical axis X, due to the helicoid threads between the lens holder 14 and the diametrically-smaller section 20B of the driver sleeve element 20. Nevertheless, the rotational movement of the lens holder 14 is prevented due to the slidable engagement of the piece element 24 in the linear groove 14A. Namely, the lens holder 14 is subjected to only a translational movement along the optical axis X, and a direction of the translational movement of the lens holder 14 along the optical axis X depends upon a rotational direction of the driven-ring element 18.

In short, the rotational movement of the driven-ring element 18 is converted into the translational movement of the lens holder 14 by the above-mentioned drive mechanism, and thus the focusing adjustment can be performed in accordance with a distance between the camera and an object to be photographed.

To exert a rotational movement on the driven-ring element 18 in the AF mode, a first shaft 26 is rotatably supported by the end 12A and slidably received through the inner annular wall element 12B of the immovable cylindrical member 12. A gear 28 is securely mounted on an end of the first shaft 26, extending through and projecting from the inner annular wall element 12B, and is engaged with an annular inner gear unitarily formed around an inner annular end area of the driven-ring element 18. Also, a gear 30 is mounted on a section of the first shaft 26 between the end 12A and the inner annular wall element 12B of the immovable cylindrical member 12. The gear 30 is slidable along and with the first shaft 26. For example, the first shaft 26 is formed with a key groove which partially extends along a longitudinal axis thereof, and the gear 30 has a key slidably engaged in the key groove. As shown in FIGS. 1 and 2, a compressed coil spring 32 is provided around the first shaft 26, and is constrained between the gear 30 and the end 12A of the immovable cylindrical member 12, whereby the gear 30 is resiliently biased toward the inner annular wall element 12B of the immovable cylindrical member 12.

Note, the gear 30 is movable between an auto-focusing (AF) position, as shown in FIG. 1, and a manual-focusing (MF) position, as shown in FIG. 2, and the movement of the gear 30 is explained in detail hereinafter.

To exert the rotational movement on the driven-ring element 18 in the AF mode, a second shaft 34 is also rotatably supported by the end 12A and the inner annular wall element 12B of the immovable cylindrical member 12. The second shaft 34 is provided with a gear 36 securely mounted thereon, and the gear 36 is engaged with the gear 30 when in the AF mode shown in FIG. 1. The second shaft 34 extends through the end 12A of the immovable cylindrical member 12, and has a coupler 37 formed at the projecting free end thereof. The coupler 37 is operatively engaged with a coupler 38, which is securely attached to an output shaft of a suitable drive motor 39 provided in the camera body, upon attachment of the lens barrel to the camera body. The drive motor 39, such as a stepping motor, a servo-motor or the like, is controlled in accordance with an auto-focusing system of the camera.

In short, in the AF mode, a rotational drive force is transmitted from the drive motor 39 to the driven-ring element 18 through the above-mentioned transmission mechanism, whereby the focusing adjustment is performed.

To exert a rotational movement on the driven-ring element 18 in the MF mode, a dual-purpose manual-focusing ring 40 is rotatably mounted on the immovable cylindrical member 12, which also serves as an AF/MF changeover-operating ring, operated by the user to select either the AF mode or the MF mode.

In particular, as is apparent from FIGS. 1 and 2, the manual-focusing ring 40 is movable along the optical axis X between an auto-focusing (AF) position, as shown in FIG. 1, and a manual-focusing (MF) position, as shown in FIG. 2. To regulate the movement of the manual-focusing ring 40 between the AF position and the MF position, a pair of V-shaped in cross-section grooves 40A and 40B is circumferentially formed in an inner wall surface of the manual-focusing ring 40, the grooves 40A and 40B being spaced apart from each other by a given distance. Further, as shown in FIGS. 1 and 2, a ball element 42 is located in a recess formed in the immovable cylindrical member 12, and is resiliently biased to be engaged in one of the V-shaped in cross-section grooves 40A and 40B by a compressed coil spring 43, accommodated in the recess. Namely, the manual-focusing ring 40 is movable along the optical axis X between the AF position, at which the ball element 42 is resiliently engaged in the groove 40A, and the MF position, at which the ball element 42 is resiliently engaged in the groove 40B.

The manual-focusing ring 40 is provided with a clutch plate 44, which slidably extends through the inner annular wall element 12B of the immovable cylindrical member 12. As shown in FIGS. 1 and 2, one end portion 44A of the clutch plate 44 is perpendicularly bent, and is extended through an arcuate opening 12D circumferentially formed in the immovable cylindrical member 12. The bent end portion 44A terminates by being slidably received in an arcuate groove 40C, which is circumferentially formed in the inner wall surface of the manual-focusing ring 40. On the other hand, an other end portion 44B of the clutch plate 44 is also perpendicularly bent, and terminates with a fork, which is slidably received by the first shaft 26 at a location between the inner annular wall element 12B and the slidable gear 30.

As is apparent from FIG. 1, when the manual-focusing ring 40 is at the AF position, the slidable gear 30 is positioned at the AF position, and is in engagement with the gear 36. However, when the manual-focusing ring 40 is moved from the AF position to the MF position, the slidable gear 30 is also moved from the AF position to the MF position against the resilient force of the compressed coil spring 32, so that the slidable gear 30 is disengaged from the gear 36, as shown in FIG. 2.

Namely, when the manual-focusing ring 40 is at the AF position, i.e. when the slidable gear 30 is engaged with the gear 36 (FIG. 1), the rotational drive force is transmitted from the drive motor 39, provided in the camera body, to the driven-ring element 18.

On the contrary, when the MF mode is selected by the user, i.e. when the slidable gear 30 is disengaged from the gear 36 (FIG. 2), a rotational movement of the manual-focusing ring 40 is transmitted to the driven-ring element 18 by a mechanism as described below.

Figure 3:
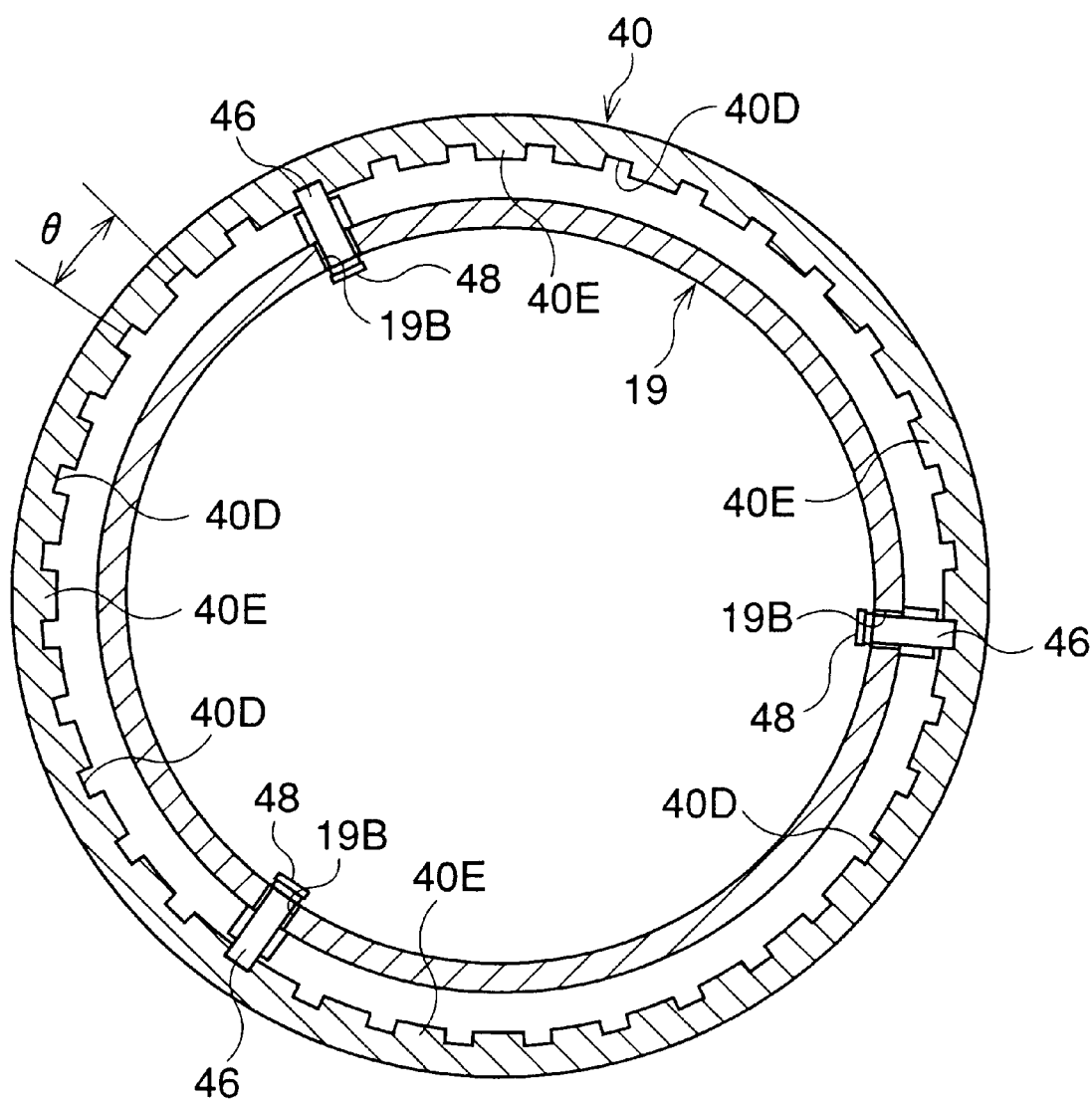
FIG. 3 is a cross-sectional view taken along a line III—III of FIG. 2.

The annular sleeve element 19 extends beyond a furthest end face, relative to the end 12A of the immovable cylindrical member 12, of the driven-ring element 18. As shown in FIG. 3, in this embodiment, three radial holes 19B are formed in the extended portion of the annular sleeve element 19, and are circumferentially spaced from each other at regular intervals. Each of the radial holes 19B loosely receives a pin element 46 securely mounted on an end of a leaf spring 48, such that the pin element 46 is resiliently biased radially outward by the leaf spring 48. The other end of the leaf spring 48 is securely fixed to an end of the annular sleeve element 19, which is near to the end 12A of the immovable cylindrical member 12. Namely, the leaf spring 48 is supported in a cantilever fashion by the annular sleeve element 19, so as to be extended adjacent to and along an inner wall surface of the annular sleeve element 19, as shown in FIGS. 1 and 2. Also, each of the pin elements 46 is received in and passed through an arcuate slot 12E, which is circumferentially formed in the immovable cylindrical member 12.

As best shown in FIG. 3, recesses 40D and lands 40E are circumferentially and alternately formed on the inner wall surface of the manual-focusing ring 40, so as to be arranged at a predetemined pitch angle of θ (FIG. 3). When the manual-focusing ring 40 is moved from the AF position (FIG. 1) to the MF position (FIG. 2), each of the pin elements 46 can be engaged in one of the recesses 40D. Accordingly, a manual rotational force of the manual-focusing ring 40 is transmitted to the driven-ring element 18, whereby the focusing adjustment is performed in the MF mode.

Figure 4:
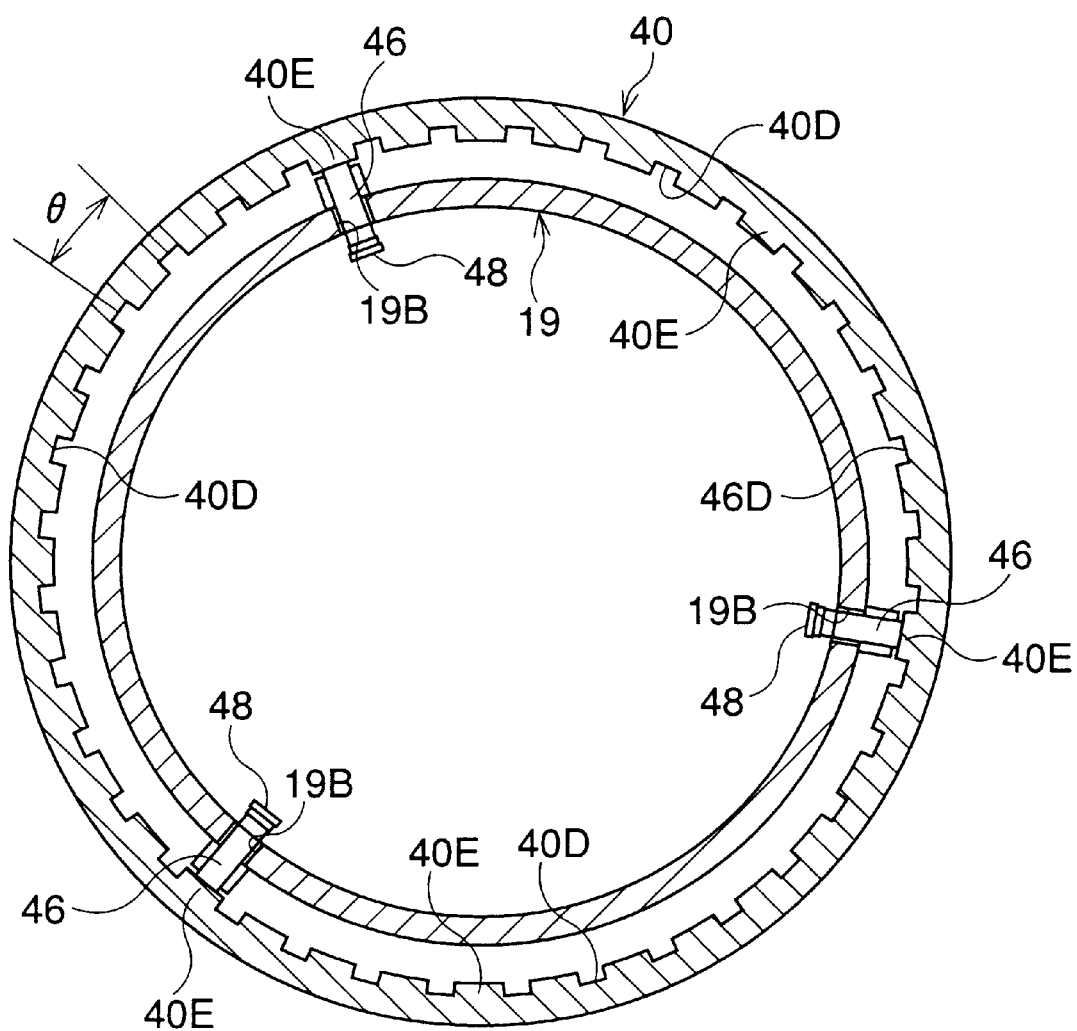
FIG. 4 is a cross-sectional view similar to FIG. 3, showing a manual-focusing ring of the lens barrel at a position different from that of FIG. 3.

When the manual-focusing ring 40 is moved from the AF position to the MF position, the pin elements 46 may be stood on the lands 40E without engaging with the respective recesses 40D, as shown in FIG. 4. In this case, since the pin elements 46 are in resilient frictional engagement with the respective lands 40E, due to the urging force of the leaf springs 48, the rotational force of the manual-focusing ring 40 may be transmitted to the driven-ring element 18. Although slippage occurs between the pin elements 46 and the lands 40E, during the rotation of the manual-focusing ring 40, the transmission of the rotational force of the manual-focusing ring 40 to the driven-ring element 18 is ensured, because the engagement of the pin elements 46 in the recesses 40D can be obtained by rotating the manual-focusing ring 40 over an angle less than or equal to θ.

In either case, the achievement of the focusing adjustment is ensured in the MF mode as long as the manual-focusing ring 40 is positioned at the MF position.

It is preferable to prevent the manual-focusing ring 40 from being rotated when the manual-focusing ring 40 is at the AF position, even if the transmission of the rotational force of the manual-focusing ring 40 to the driven-ring element 18 is impossible. To this end, a hole 12F is formed in the immovable cylindrical member 12 at a location between the arcuate opening 12D and the arcuate slot 12E of the immovable cylindrical member 12, and receives a locking pin element 50 securely mounted on an end of a leaf spring 52, such that the locking pin element 50 is resiliently biased radially outward by the leaf spring 52 so as to project through the hole 12F. The other end of the leaf spring 50 is securely fixed to the inner wall surface of the immovable cylindrical member 12, such that the leaf spring 52 extends over the arcuate opening 12D. Namely, the leaf spring 50 is supported in a cantilever fashion by the immovable cylindrical member 12.

Accordingly, when the manual-focusing ring 40 is moved from the MF position (FIG. 2) to the AF position (FIG. 1), the locking pin element 50 can be surely engaged in one of the recesses 40D, similar to the pin elements 46, whereby the manual-focusing ring 40 is prevent from being rotated in an auto-focusing operation.

Figure 5:
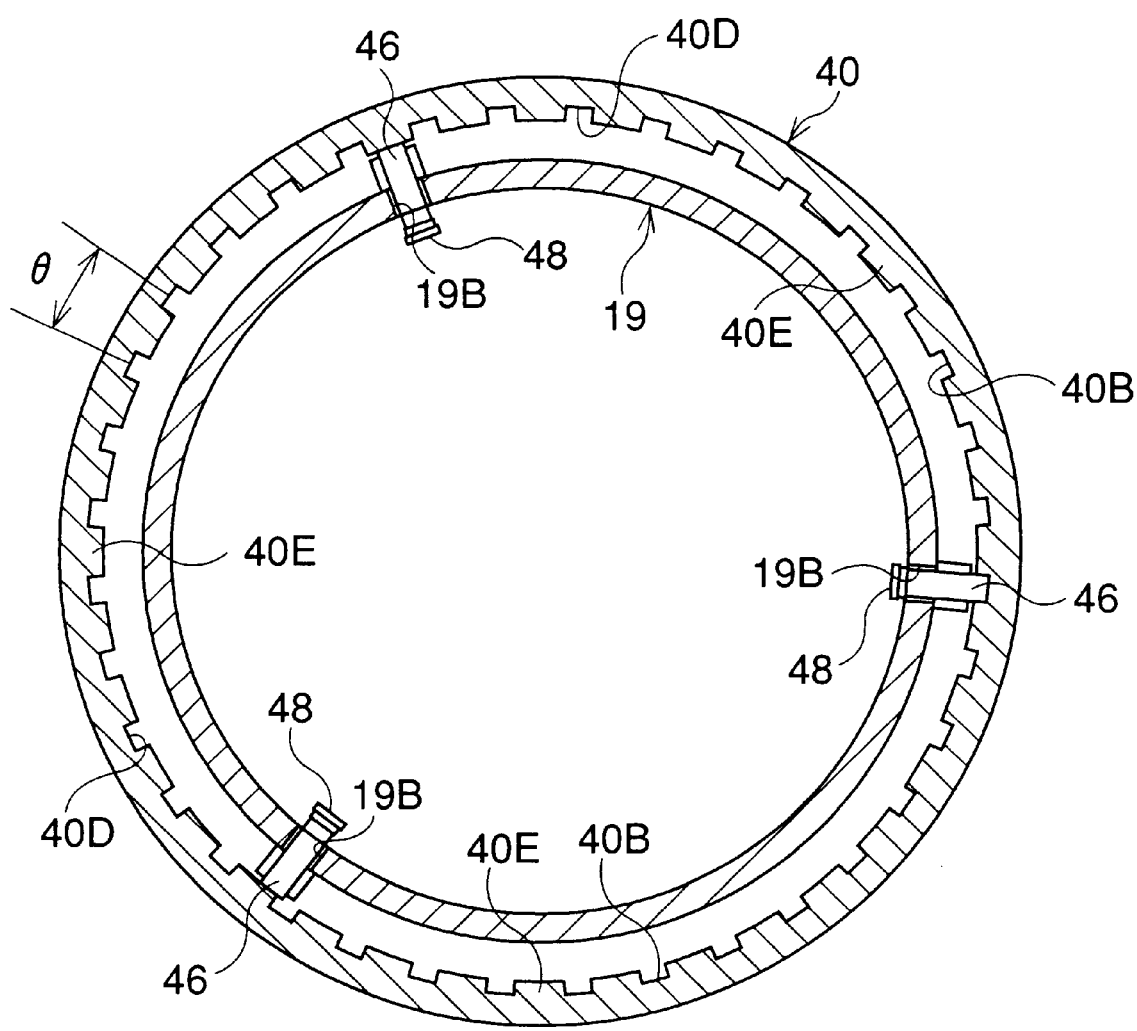
FIG. 5 is a cross-sectional view similar to FIG. 3, showing a modification of an arrangement shown in FIGS. 3 and 4.

FIG. 5 shows a modification of the arrangement of the three pin elements 46, as shown in FIGS. 3 and 4. In the modified arrangement, the pin elements 46 are not disposed at the regular intervals around the circumference of the annular sleeve element 19.

In the arrangement of the pin elements 46, as shown in FIGS. 3 and 4, the pin elements 46 are disposed at the regular intervals around the circumference of the annular sleeve element 19, and an angle between the two adjacent pin elements 46 is equal to a multiple of an integer and the pitch angle of θ. Accordingly, all of the pin elements 46 are simultaneously engaged in the recesses 40D.

On the contrary, in the modified arrangement of the pin elements 46, as shown in FIG. 5, an angle between the two adjacent pin elements 46 is not equal to a multiple of an integer and the pitch angle of θ. Namely, the three pin elements 46 cannot be simultaneously positioned at locations which are in synchronization with a pitch frequency of the alternately arranged recesses 40D and lands 40E, and thus cannot be simultaneously engaged in the recesses 40D. For example, when one of the three pin elements 46 is positioned at a location which coincides with the pitch frequency of the alternately arranged recesses 40D and lands 40E, i.e. when one of the three pin elements 46 is engaged in one of the recesses 40D, another one of the pin elements 46 is positioned at a location which is offset by an angle of θ/2 with respect to the phase of the pitch frequency, and the remaining one of the pin elements 46 is positioned at a location which is offset by an angle of θ/4 with respect to the phase of the pitch frequency.

Thus, according to the modification of FIG. 5, when the manual-focusing ring 40 is moved from the AF position (FIG. 1) to the MF position (FIG. 2), a possibility of immediate engagement of one of the pin elements 46 in one of the recesses 40D is almost certain. Also, even if all of the pin elements 46 are stood on the lands 40E, one of the pin elements 46 can be immediately engaged in one of the recesses 40D after the manual-focusing ring 40 is rotated by, at the most, an angle of θ/4.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-189159 (filed on Jun. 30, 1997), which is expressly incorporated herein, by reference, in its entirety.

We claim:

1. A lens barrel comprising:
   an immovable cylindrical member that is detachably mountable on a camera body;
   a movable cylindrical member that includes a group of focusing lenses held therein, said movable cylindrical member being disposed in said immovable cylindrical member so as to be movable along an optical axis of said group of focusing lenses such that a focusing adjustment is performed;
   a manual-focusing ring rotatably mounted on said immovable cylindrical member, said manual-focusing ring being manually movable along said optical axis between an auto-focusing position and a manual-focusing position, said manual-focusing ring having a plurality of recesses circumferentially arranged and formed on an inner wall surface thereof; and
   a drive mechanism provided between said immovable cylindrical member and said movable cylindrical member to convert a rotational movement into a translational movement of said movable cylindrical member along said optical axis, said drive mechanism having at least a pin element which is subjected to said rotational movement,
   wherein said pin element is engaged in one of said plurality of recesses of said manual-focusing ring when said manual-focusing ring is positioned at said manual-focusing position such that a rotation of said manual-focusing ring is transmitted to said drive mechanism, and said pin element is disengaged from said one of said plurality of recesses of said manual-focusing ring when said manual-focusing ring is positioned at said auto-focusing position.

2. A lens barrel as set forth in claim 1, wherein said pin element is resiliently biased toward the inner wall surface of said manual-focusing ring by an urging element, whereby said pin element is positively engaged in said one of said plurality of recesses.

3. A lens barrel as set forth in claim 1, wherein said drive mechanism includes an annular sleeve element having a hole that receives said pin element, and a leaf spring element supported in a cantilevered-fashion by said annular sleeve element, said pin element being securely fixed to a free end of said leaf spring element.

4. A lens barrel as set forth in claim 1, wherein said immovable cylindrical member includes a resiliently-biased locking pin element, and said resiliently-biased locking pin element is engaged in one of said plurality of recesses when positioning said manual-focusing ring at said auto-focusing position, whereby said rotation of said manual-focusing ring is prevented.

5. A lens barrel as set forth in claim 1, wherein said plurality of recesses are arranged at a predetermined pitch angle, and said drive mechanism comprises at least two pin elements positioned to be independently coincident with a pitch frequency of occurrence of said plurality of recesses.

6. A lens barrel as set forth in claim 1, wherein said plurality of recesses are arranged at a predetermined pitch angle, and said drive mechanism comprises at least two pin elements positioned to be alternately non-coincident with a pitch frequency of occurrence of said plurality of recesses.

7. A lens barrel comprising:
   an immovable cylindrical member that is detachably mountable on a camera body;
   a movable cylindrical member that a group of focusing lenses held therein, said movable cylindrical member being disposed in said immovable cylindrical member so as to be movable along an optical axis of said group of focusing lenses such that a focusing adjustment is performed;
   a manual-focusing ring rotatably mounted on said immovable cylindrical member, said manual-focusing ring being manually movable along said optical axis between an auto-focusing position and a manual-focusing position, said manual-focusing ring having a plurality of recesses circumferentially arranged and formed on an inner wall surface thereof;
   a drive mechanism provided between said immovable cylindrical member and said movable cylindrical member to convert a rotational movement into a translational movement of said movable cylindrical member along said optical axis, said drive mechanism having at least a pin element which is subjected to said rotational movement;
   a rotational movement transmission system that is operatively connectable to a rotational movement generator, provided in said camera body, on attaching said immovable cylindrical member to said camera body, so that a rotational movement of said rotational movement generator is transmitted to said drive mechanism; and
   a changeover mechanism that disengages said rotational movement transmission system when said position of said manual-focusing ring is at said manual-focusing position, and that disengages said manual-focusing ring from said drive mechanism when said position of said manual-focusing ring is at said auto-focusing position, wherein an engagement is established between said drive mechanism and said manual-focusing ring, when said position of said manual-focusing ring is at said manual-focusing position, such that said pin element is engaged in one of said plurality of recesses of said manual-focusing ring so that a rotation of said manual-focusing ring is transmitted to said drive mechanism.

8. A lens barrel as set forth in claim 7, wherein said pin element is resiliently biased toward the inner wall surface of said manual-focusing ring by an urging element, whereby said pin element is positively engaged in said one of said plurality of recesses.

9. A lens barrel as set forth in claim 7, wherein said drive mechanism includes an annular sleeve element having a hole that receives said pin element, and a leaf spring element supported in a cantilevered-fashion by said annular sleeve element, said pin element being securely fixed to a free end of said leaf spring element.

10. A lens barrel as set forth in claim 7, wherein said immovable cylindrical member includes a resiliently-biased locking pin element, and said resiliently-biased locking pin element is engaged in one of said plurality of recesses when positioning said manual-focusing ring at said auto-focusing position, whereby said rotation of said manual-focusing ring is prevented.

11. A lens barrel as set forth in claim 7, wherein said plurality of recesses are arranged at a predetermined pitch angle, and said drive mechanism comprises at least two pin elements positioned to be independently coincident with a pitch frequency of occurrence of said plurality of recesses.

12. A lens barrel as set forth in claim 7, wherein said plurality of recesses are arranged at a predetermined pitch angle, and said drive mechanism comprises at least two pin elements positioned to be alternately non-coincident with a pitch frequency of occurrence of said plurality of recesses.

* * * * *